Aug. 22, 1950  H. B. PATTEN  2,519,598
CONTROL MECHANISM
Filed April 20, 1945  4 Sheets-Sheet 1

Inventor
Harry B. Patten
By his Attorney

Aug. 22, 1950     H. B. PATTEN     2,519,598
CONTROL MECHANISM

Filed April 20, 1945     4 Sheets-Sheet 2

Inventor
Harry B. Patten

Inventor
Harry B. Patten
By his Attorney

Aug. 22, 1950  H. B. PATTEN  2,519,598
CONTROL MECHANISM
Filed April 20, 1945  4 Sheets-Sheet 4

Inventor
Harry B. Patten
By his Attorney

Patented Aug. 22, 1950

2,519,598

UNITED STATES PATENT OFFICE 2,519,598

CONTROL MECHANISM

Harry B. Patten, Beverly, Mass., assignor to United Shoe Machinery Corporation, Flemington, N. J., a corporation of New Jersey Application April 20, 1945, Serial No. 589,410

7 Claims. (Cl. 192—142)

This invention relates to control mechanisms and is herein illustrated as embodied in a mechanism for controlling the operation of a fuse-setting apparatus whereby the extent to which the fuse of a round of ammunition is set is readily and accurately controlled.

An object of the invention is to provide an improved control mechanism for a rotary shaft provided with a drive member rotatably mounted thereon and a driven member secured to the shaft for rotation therewith, there being provision for coupling the driven member and the drive member for unitary movement, and control means for stopping rotation of the driven member at any predetermined point in the rotation of the drive member.

With the above object in view, a fuse setter head is carried by a drive shaft on which is rotatably mounted a worm gear arranged to be turned by a drive member through a fixed predetermined angle in one direction and then reversely through the same angle during each fuse-setting operation. The shaft has keyed to it a driven member having a hub extending along the shaft and a pair of radially extending arms spaced from the drive gear and provided with apertures containing balls of greater diameter than the thickness of the arms. These balls form a driving connection between a power transmitting member at one side of the arms and having recesses arranged to receive the projecting portions of the balls which are held in the recesses by a control plate at the opposite side of the arms. The power transmitting member is similarly connected to the drive gear. The aforementioned plate carries a stop which lies in the path of movement of a pin carried by one of the arms of the driven member for interrupting movement of the driven member at a predetermined time in the rotation of the drive gear depending upon the position of the plate. At that time the balls enter recesses in the plate and the power transmitting member with the drive gear continue to operate to complete their movement. The construction permits sudden stopping of the driven member without backlash and without the necessity of immediately stopping the drive motor which operates until the drive gear has been turned a predetermined amount whereupon the current to the motor is interrupted and the motor and drive member coast to a stop.

The above and other features of the invention, including various novel combinations of parts and details of construction, will now be described in detail by reference to the accompanying drawings and pointed out in the claims.

Figure 1:
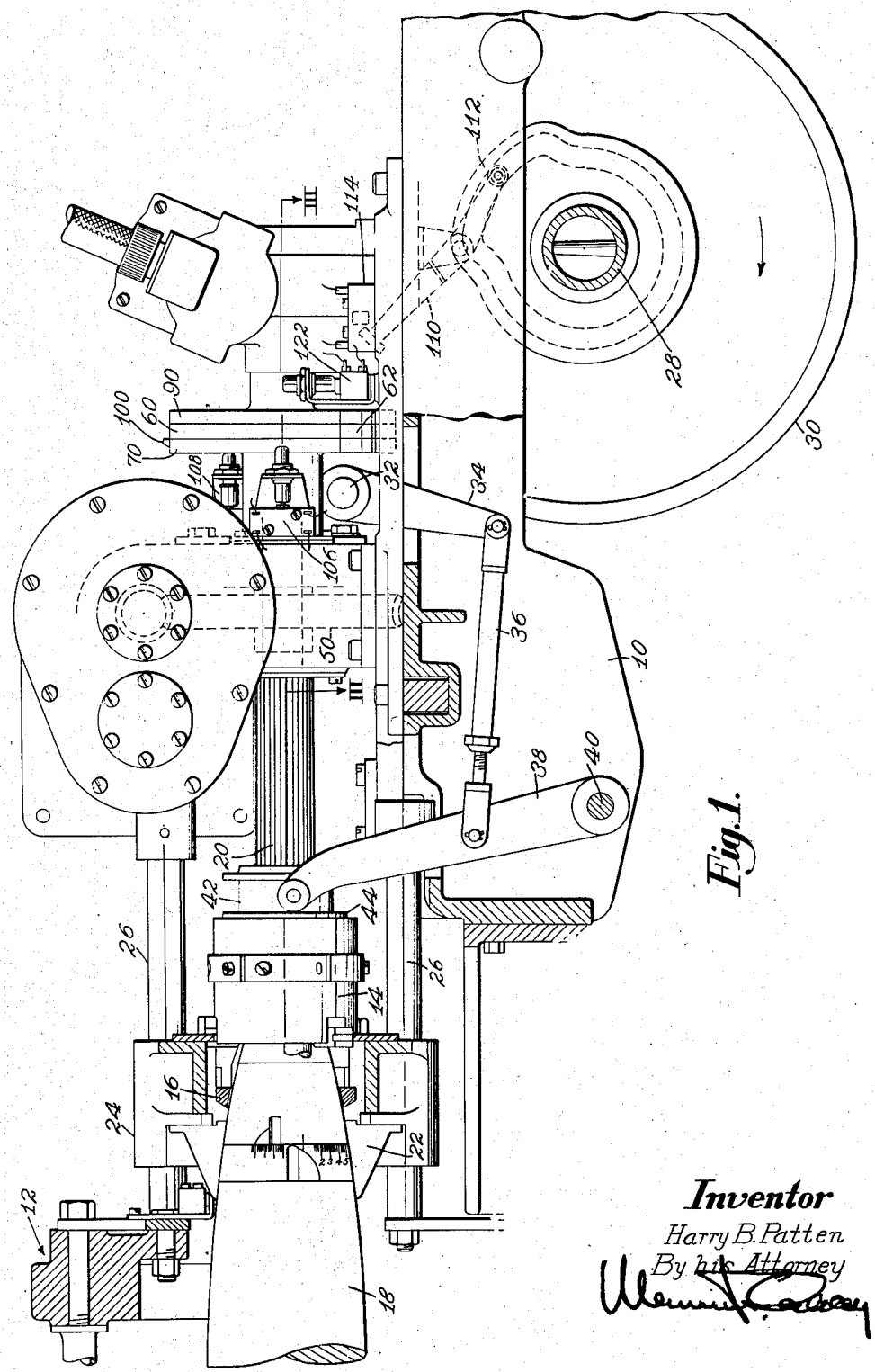
Fig. 1 is an elevation partly in section of one form of apparatus in which the invention is embodied.

The invention is illustrated as embodied in a control device for a fuse-setting mechanism associated with a gun-loading mechanism of the type shown and described in Letters Patent of the United States No. 2,417,300, granted on March 11, 1947, on an application filed in the name of Chester W. Greene. The fuse-setting mechanism is carried by a support 10 (Fig. 1) extending between and secured to the arms of the carriage shown in that application forwardly of a rounds magazine 12.

The fuse-setting mechanism includes a fuse setter head 14 carrying a plurality of knives 16 engageable with the fuse ring of a round 18. This head is mounted for sliding movement along a splined shaft 20 which at the proper time is turned to rotate the fuse ring of the round. For holding the round against rotation during the fuse-setting operation a plurality of knives 22 are provided, these knives being carried by a support 24 arranged for sliding movement toward and away from the magazine 12 in which the round 18 is positioned for the fuse-setting operation. The support 24 is carried for sliding movement by a plurality of rods 26 projecting forwardly of the magazine 12. The head 14 is moved along the shaft 20 toward and away from the round by a cam shaft 28 provided with a cam 30 which through a cam roll and a bell crank lever (not shown) operates a shaft 32 carrying a downwardly extending arm 34 connected by a link 36 to a lever 38 pivoted at 40 to the support 10. The upper end of the lever 38 is forked and carries rolls engageable in a groove 42 of a sleeve 44 carried by the head 14.

Figure 2:
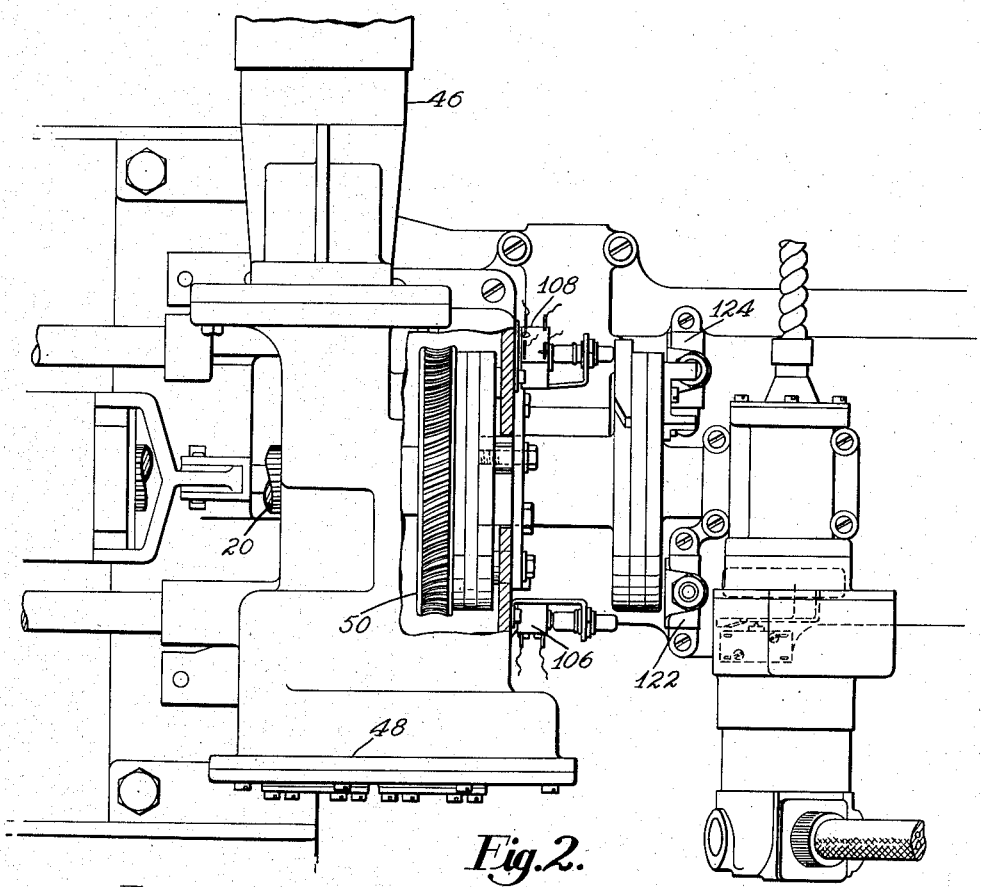
Fig. 2 is a plan view partly in section of the control mechanism by which the amount of fuse setting is determined.
Figure 3:
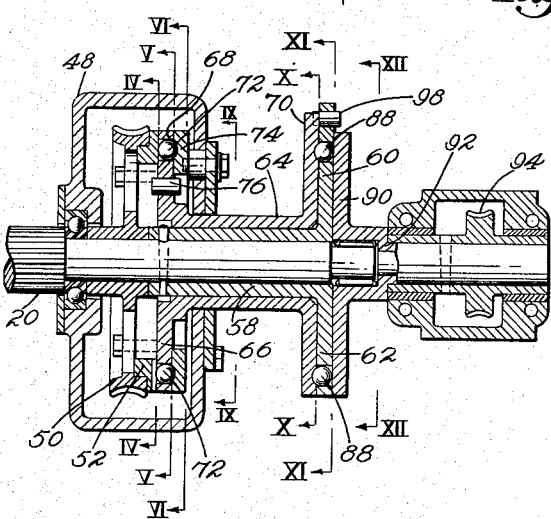
Fig. 3 is a section through the control mechanism on the line III—III of Fig. 1.
Figure 4:
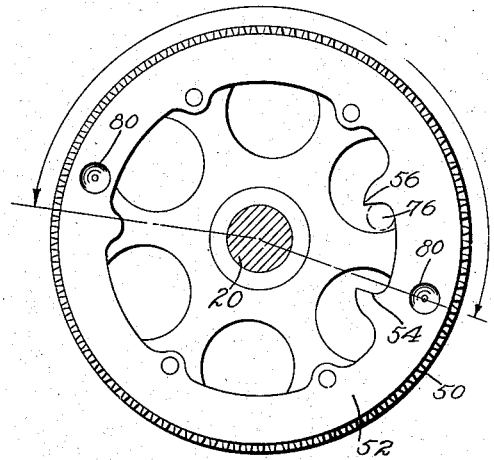
Fig. 4 is a section on the line IV—IV of Fig. 3, showing the drive member of the control mechanism.
Figure 8:
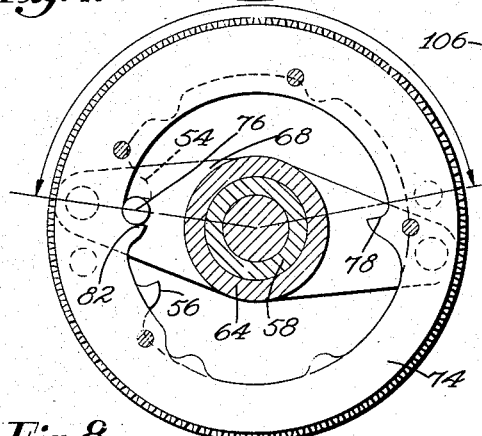
Fig. 8 is a view similar to Fig. 7, illustrating the positions of the parts after the drive member has completed its movement in a counterclockwise direction.
Figure 9:
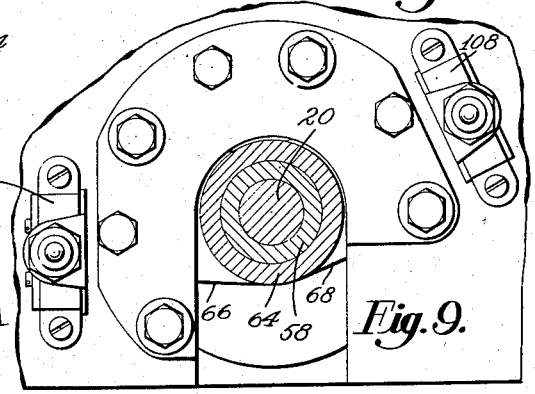
Fig. 9 is a section on the line IX—IX of Fig. 3.

For driving the shaft 20 during the fuse-setting operation, an electric motor 46 (Fig. 2) is provided and is connected by gearing in a gear housing 48 to a worm gear 50 which is rotatably mounted on the forward end of the splined shaft 20 as shown in Fig. 3. The worm gear has secured to it a ring 52 which, as shown most clearly in Figs. 4 and 8, is provided with a pair of inwardly extending teeth 54 and 56, the purpose of which will appear as the description proceeds.

Figure 5:
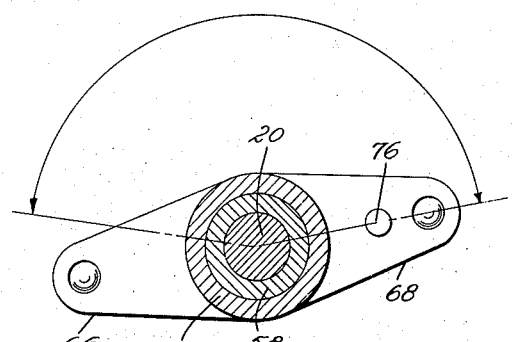
Fig. 5 is a section on the line V—V of Fig. 3, illustrating a portion of the power transmitter.
Figure 10:
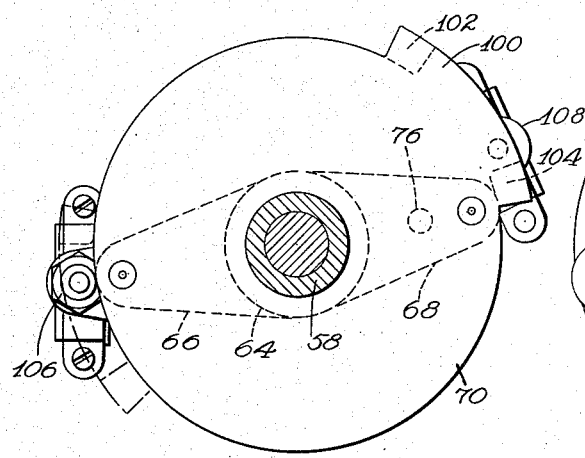
Fig. 10 is a section on the line X—X of Fig. 3, illustrating the forward portion of the power transmitter member.
Figure 11:
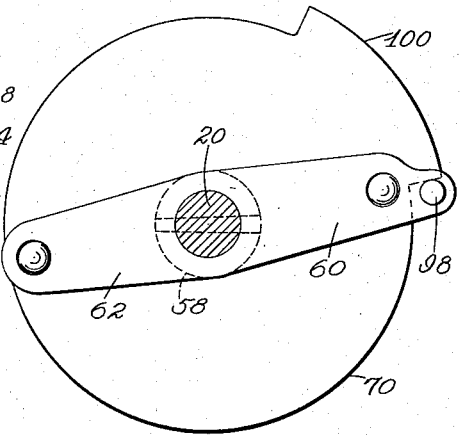
Fig. 11 is a section on the line XI—XI of Fig. 3 illustrating the relationship of the driven member and the power transmitting member with the parts in their initial positions.

Keyed to the forward end of the shaft just forwardly of the worm gear 50 is a driven member 58 having a pair of outwardly and oppositely extending arms 60, 62 suitably spaced from the worm gear 50. Power is transmitted from the drive member 50, 52 to the driven member 58 by means of a power transmitter 64 journaled on the hub of the member 58 and provided with outwardly and oppositely extending arms 66, 68 (Fig. 5) which lie adjacent to the forward surface of the ring 52. The power transmitter 64 also includes a disk portion 70 (Figs. 3, 10 and 11) which lies adjacent to the rearward surfaces of the arms 60 and 62 of the driven member 58.

Figure 6:
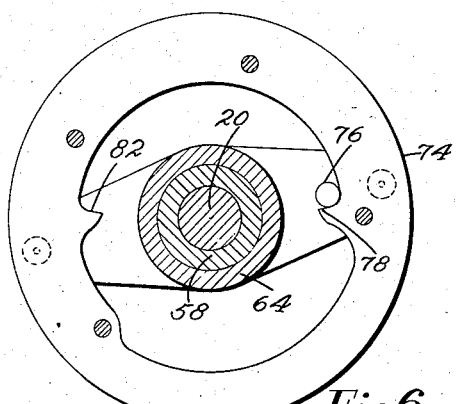
Fig. 6 is a section on the line VI—VI of Fig. 3, illustrating the means by which the movement of the power transmitter is limited in each direction.

Before the start of the fuse-setting operation the power transmitter 64 is locked in a predetermined position by the structure described below. The arms 66 and 68 of the power transmitter are provided with apertures in which are located balls 72 the diameters of which exceed the thickness of the arms 66, 68 so that the balls project beyond the forward surface of the arms and are seated in recesses formed in a locking ring 74 secured to a wall of the housing 48, the balls being held there by the ring 52 carried by the worm gear 50. The arm 68 of the power transmitter 64 carries a pin 76 which projects beyond the front and rear surfaces of the arm and engages a tooth 78 (Figs. 6 and 7) in the locking ring 74 which thereby limits the clockwise movement of the power transmitter 64 as viewed in Figs. 6 and 7. With the parts in their initial positions the rearward end of the pin 76 lies in the path of movement of the tooth 54 (Fig. 4) of the ring 52 carried by the worm gear 50 so that upon movement of the worm gear in a counterclockwise direction from the position shown in Fig. 4 to the position shown in Fig. 7, the tooth 54 moves into engagement with the pin 76. The ring 52 has a pair of recesses 80 which are brought into register with the balls 72 at the instant that the tooth 54 of the ring 52 engages the pin 76 in the power transmitter 64.

The drive member 50, 52 and the power transmitter 64 now turn as a unit until the pin 76 moves into engagement with a tooth 82 (Figs. 6 and 7) in the fixed locking ring 74 which tooth is illustrated herein as being spaced somewhat less than 180° from the tooth 78, thereby limiting the counterclockwise movement of the member 64. Shortly before the pin 76 engages the tooth 82 the current to the electric motor 46 is cut off as will be described, but the drive member 50, 52 is permitted to move somewhat further to permit coasting movement of the motor until engagement of pin 76 with the tooth 82.

The power transmitter 64 is connected to the driven member 58 for a predetermined time during the operation of the drive member in accordance with the desired amount of fuse-setting so that whereas the drive member is operated through a fixed predetermined angular extent during each fuse-setting operation, the shaft 20 will rotate a readily variable determined amount. The power transmitter 64 is connected to the driven member 60 by a pair of balls 88 received in apertures in the arms 60, 62 of the driven member, these balls being greater in diameter than the thickness of these arms so that they extend outwardly thereof. The disk portion 70 of the power transmitter has a pair of recesses arranged to receive the projecting portions of the balls 88 when the parts are in their initial positions, the balls being thus held by a timing disk 90 rotatable on the forward reduced end portion of the shaft 20. The timing disk 90 has a forwardly projecting tubular portion 92 concentric with the shaft 20 and to this tubular portion is keyed a worm gear 94 arranged to be driven by a worm (not shown) by which the angular position of the timing disk 90 is varied. Any suitable mechanism may be employed for operating the worm gear 94 thereby to adjust the position of timing disk 90 in accordance with the desired amount of fuse setting.

Figure 12:
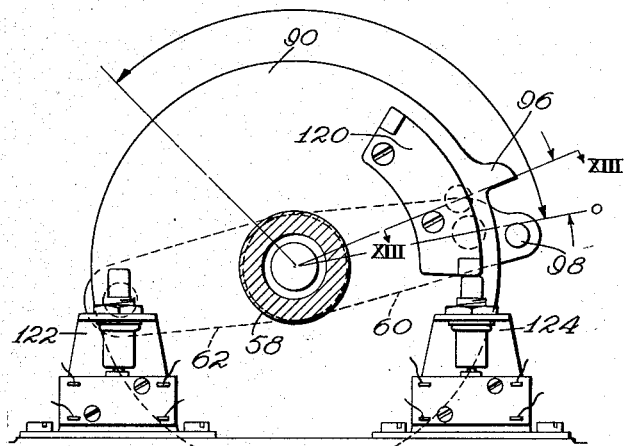
Fig. 12 is a section on the line XII—XII of Fig. 3, illustrating the timing disk in its initial position and its relationship to the driven member.
Figure 13:
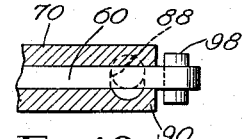
Fig. 13 is a section on the line XIII—XIII of Fig. 12.
Figure 14:
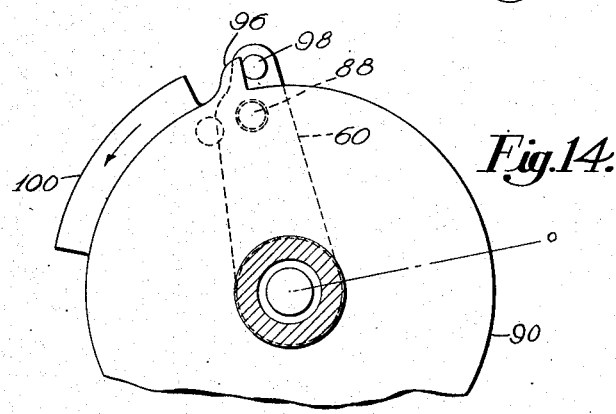
Fig. 14 is a view similar to Fig. 12, but illustrating the timing disk adjusted in accordance with the desired movement of the driven member and with the driven member at the end of its movement as determined by the timing disk.

The timing disk 90 is provided with an outwardly extending ear 96 (Figs. 12 and 14) arranged in the path of movement of a pin 98 carried by the arm 60 of the driven member 58. When the driven member has been rotated an amount corresponding to the position of the timing disk 90 the pin 98 moves into engagement with the ear 96 of the timing disk as shown in Fig. 14 thereby preventing further movement of the driven member. At the same instant the balls 88 in the arms 60 and 62 of the driven member move into register with a pair of recesses in the timing disk so that the disk portion 70 of the power transmitter 64 is no longer locked by the balls to the driven member 58 and can now move relatively to the driven member until the motion of the worm gear 50 is arrested.

Figure 7:
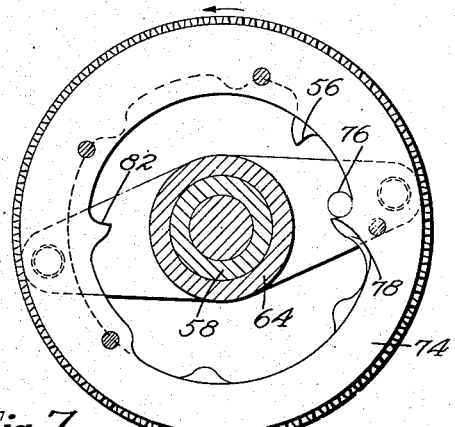
Fig. 7 is a view of the members shown in Figs. 4, 5 and 6 in associated relationship and with the drive member turned in the direction of the arrow slightly from its initial position.

The power transmitter disk 70 includes a projection 100 (Figs. 10, 11 and 14) having at its opposite ends cam portions 102, 104 (Fig. 10) arranged to operate a pair of switches 106, 108 respectively. After the worm gear 50 has nearly completed its movement in a counterclockwise direction as viewed in Figs. 4 and 5, the cam surface 102 of the projection 100 operates the switch 106 to interrupt the circuit to the electric motor 46 by which the worm gear is driven. The motor now coasts until the pin 76 in the arm 68 of the power transmitter 64 engages the tooth 82 in the locking ring 74 whereupon movements of the power transmitter 64 and the drive member 50, 52 which are locked together at this time by the balls 72 are halted. The actuation of the switch 106 also initiates operation of the cam shaft 28 as described in the Greene application referred to above. The cam shaft causes withdrawal of the fuse setter head from the nose of the round and also causes the round to be transferred from the magazine and loaded into the gun as described in the Greene patent. At the beginning of the movement of the cam shaft a switch actuating arm 110 is moved by a cam 112 on the cam shaft 28 thereby to actuate a switch 114 which causes reversal of the fuse-setter motor 46. The worm gear 50 is now rotated in a clockwise direction as viewed in Figs. 4 and 5 thereby returning the power-transmitting member 64 to its initial position. After the power-transmitting member has been moved sufficiently so that its recesses register with the balls 88 in the driven member the pin 98 is engaged by the projection 100 on the disk 70 and the driven member 58 is moved with the power transmitter back to its initial position. This movement continues until the pin 76 engages the tooth 78 in the locking ring 74 as shown in Fig. 7 and simultaneously therewith the cam surface 104 of the projection 100 actuates the switch 108 to interrupt the circuit to the fuse setter motor 46. The motor now coasts to a stop, the drive member 50, 52 moving relatively to the power transmitter 64, this movement being permitted by reason of the fact that the balls 72 are now in register with the recesses in the locking ring 74 and no longer lock the arms 66, 68 to the ring 52 of the drive member. The movement of the drive member is arrested when the tooth 56 of the ring 52 moves into engagement with the pin 76 as shown in Fig. 4 whereupon the parts come to rest in their initial positions in readiness for the next fuse-setting operation.

The timing disk 90 carries a switch actuating member 120 arranged to actuate a pair of switches 122 and 124 thereby to control the motor by which the timing disk is moved thereby to limit the extent of movement of the timing disk in each direction. The movement of disk 90 in a clockwise direction is limited to the position shown in Fig. 12 so that some turning of the fuse ring will result in each fuse-setting operation.

In the operation of the fuse setter the timing disk 90 is moved into a position which corresponds with the position of the target to obtain the required amount of fuse setting. When it is desired to fire the gun a switch (not shown) is closed which initiates the operation of the motor 46 whereupon the worm gear 50 and the ring 52 start to move in a counterclockwise direction from their initial position as indicated in Fig. 4 and after the tooth 54 on the ring 52 engages the pin 76 of the arm 68 the power transmitter moves with the driven member. At this time the power transmitter is connected to the driven member by the balls 88 so that the shaft 20 and the fuse-setter head are rotated. This rotation continues until the pin 98 in the arm 60 of the driven member engages the ear 96 of the timing disk as shown in Fig. 14. The balls 88 in the driven member at this time are in register with the recesses in the timing disk so that the driven member is no longer locked to the power transmitter which continues its rotation with the drive member 50, 52. These members continue their rotation in the counterclockwise direction as viewed in Figs. 7 and 8 until finally the switch 106 is actuated and the power to the motor 46 is cut off. The parts coast until the pin 76 engages the tooth 82 on the stop ring 74 as shown in Fig. 8.

At the proper time the motor 46 is reversed whereupon the worm gear 50 and the power transmitter 64 which are still coupled by the balls 72 start to return to their initial positions. Eventually the driven member 60 is coupled with the power transmitter 64 by the balls 88 and engagement of projection 100 of the disk 70 with the pin 98 so that the driven member and the fuse-setter head rotate back to their initial positions. When these positions are reached the pin 76 of the power transmitter engages the tooth 78 of the locking ring 74 so that the power transmitter and the driven member, while still coupled together, come to rest, the balls 72 in the power transmitter registering with the recesses in the locking ring. The switch 108 is actuated to interrupt the power to the motor 46 whereupon this coasts to a stop, the final position of the worm gear being determined by engagement of the tooth 56 (Figs. 4 and 7) of the ring 52 with the pin 76 in the power transmitter.

From the above it will be seen that the clutch herein described transmits power from the drive member to the driven shaft for a predetermined portion of the operation of the drive member which is readily varied whereas the drive member operates the same amount each time. The operation is smooth and the driven member comes to a stop and is locked in its stopped position without rebound inasmuch as the drive member itself does not have to be stopped abruptly with it but continues to the end of its movement coasting to a gradual stop.

Having thus described the invention, what I claim as new and desire to secure by Letters Patent of the United States is:

1. In combination, a driven member, means including an electric motor for rotating said driven member during a cycle of operation, a circuit for conducting electrical energy to said motor, means for opening the circuit to said motor only after it has been operated a predetermined amount, said connecting means including a clutch, means for operating said clutch at a variably determined time during the operation of the motor to disconnect the driven member from the motor and for positively arresting the rotative movement of the driven member, and means for positively stopping the operation of the motor at a fixed predetermined time after the circuit is opened.

2. In combination, a rotary shaft, a drive member rotatable thereon, means for turning said drive member through a predetermined angle, a driven member secured to said shaft for rotation therewith, a coupling member carried by said driven member, means for holding said coupling member in position to transmit motion from the drive member to the driven member, means carried by said last named means for arresting the movement of said driven member during the rotation of said drive member, said arresting means being shaped to release the coupling member when the motion of the driven member is arrested, and means mounting said arresting means for adjustment whereby the extent of movement of the driven member is varied.

3. In combination, a rotary shaft, a drive member rotatable thereon, means for turning said drive member through a predetermined angle, a driven member secured to said shaft for rotation therewith, a power transmitting member associated with said driven member and having a connection with said drive member, said power transmitting member and said drive member having contiguous radially extending portions, said driven member having an aperture in its radially extended portion, a ball carried by said aperture the diameter of which is greater than the thickness of said radially extending portion of the driven member, a recess in the radially extending portion of the power transmitting member arranged to register with said ball, a plate arranged to hold the ball in said recess whereby the power transmitting member and the driven member are coupled together thereby to cause rotation of the drive shaft upon rotation of the drive member, a stop pin carried by said driven member, a stop carried by said plate arranged in the path of movement of the stop pin, means for adjusting the position of the plate, said plate having a recess arranged to receive a portion of the ball at the moment that the stop pin engages the stop whereupon the power transmitting member is capable of rotating relatively to the driven member for the completion of the operation of the drive member.

4. In combination, a rotary shaft, a drive member rotatable thereon, means for turning said drive member through a predetermined angle, a driven member secured to said shaft for rotation therewith, a power transmitting member for connecting said drive member and said driven member, an electric motor for operating said drive member, a switch controlling the operation of said motor, means carried by said power transmitting member for operating said switch at a predetermined time in the operation of said drive member to open the circuit to said motor, a coupling member carried by said driven member, means for holding said coupling member in position to transmit motion from said drive member to said driven member, means carried by said last named means for arresting movement of the driven member during the rotation of the drive member, said arresting means being shaped to release the coupling member when the motion of the driven member is arrested, and means mounting said arresting means for adjustment whereby the extent of movement of the driven member is varied.

5. In combination, a rotary shaft, a drive member rotatable thereon, means for turning said drive member through a predetermined angle, a driven member secured to said shaft for rotation therewith, a power transmitting member for connecting said drive member and said driven member, an electric motor for operating said drive member, a switch controlling the operation of said motor, means carried by said power transmitting member for operating said switch at a predetermined time in the operation of said drive member to open the circuit to said motor, a coupling member carried by said driven member, means for holding said coupling member in position to transmit motion from said power-transmitting member to said driven member, means carried by said last named means for arresting movement of the driven member during the rotation of the drive member, said arresting means being shaped to release the coupling member when the motion of the driven member is arrested, means mounting said arresting means for adjustment whereby the extent of movement of the driven member is varied, and means operative, following operation of said switch to interrupt the circuit to said motor, for arresting movement of the power transmitting member and the drive member after these members have coasted a predetermined distance following the opening of said circuit.

6. In combination, a rotary shaft, a drive member, an electric motor for operating said drive member, a driven member, power transmitting means for connecting said drive member and said driven member, means operative in response to a predetermined extent of rotation of said drive member for connecting said drive member and said power transmitting means, means for interrupting the operation of the driven member and disconnecting it from the power transmitting means after a predetermined rotation of the driven member, means for varying the time at which operation of the driven member is arrested, means operated by said power transmitting means for opening the circuit to said motor when said drive member has rotated a fixed predetermined amount, and means operative in response to a predetermined rotation of said drive member following the opening of the circuit to said motor for arresting motion of the drive member and the power transmitting means.

7. In combination, a rotary shaft, a drive member carried by said shaft for rotation relatively thereto, means for turning said drive member from a first position to a second position and subsequently turning it back to the first position, a driven member secured to said shaft, said driven member having a hub portion surrounding said shaft and an arm extending radially therefrom in spaced relation to said drive member, a power transmitting member rotatable on said drive member, said power transmitting member having radially extending portions one of which lies adjacent to said drive member and the other of which is adjacent to said driven member, a ball carried by an aperture in the radially extending portion of the power transmitting member adjacent to said drive member, said ball being greater in diameter than the thickness of said radially extending portion, a fixed plate adjacent to said portion on the opposite side from said drive member and having a recess arranged to receive a portion of said ball, a pin carried by said portion of the power transmitting member and extending outwardly from opposite sides thereof, means carried by said drive member arranged to engage said pin after a predetermined rotation of the drive member for causing movement of the power transmitting member therewith, said drive member having a recess to receive the ball when the parts are in driving relationship, the radially extending portion of said driven member carrying a ball in an aperture thereof, said ball being greater in diameter than the thickness of said portion of the driven member, means holding said ball in a recess in the adjacent portion of the power transmitting member whereby the driven member is operated with the power transmitting member, a stop pin carried by said driven member, a stop carried by said holding means in the path of movement of said pin for arresting movement of the driven member, mechanism for adjusting the position of said holding means, said holding means having a recess to receive the ball in the driven member upon termination of the operation of the driven member whereby the drive member and the power transmitting member rotate relatively to the driven member until the completion of the movement of the drive member.

HARRY B. PATTEN.

REFERENCES CITED

The following references are of record in the file of this patent:

UNITED STATES PATENTS

| Number | Name | Date |
|---|---|---|
| 1,803,775 | Schuler et al. | May 5, 1931 |
| 1,866,996 | Bryce | July 12, 1932 |
| 1,974,207 | Ellinger | Sept. 18, 1934 |
| 1,977,334 | Berejkoff et al. | Oct. 16, 1934 |
| 1,980,892 | Varaud | Nov. 13, 1934 |
| 2,000,448 | Keil | May 7, 1935 |
| 2,051,845 | Grubb | Aug. 25, 1936 |
| 2,079,837 | Buckley | May 11, 1937 |
| 2,085,442 | Newell | June 29, 1937 |
| 2,231,156 | Claytor | Feb. 11, 1941 |
| 2,285,414 | Collins | June 9, 1942 |
| 2,351,743 | Chappell | June 20, 1944 |
| 2,378,430 | Polsen | June 19, 1945 |
| 2,390,382 | Musson et al. | Dec. 4, 1945 |
| 2,391,470 | May | Dec. 25, 1945 |